United States Patent
Yu et al.

(10) Patent No.: US 12,308,901 B2
(45) Date of Patent: May 20, 2025

(54) METHOD AND APPARATUS FOR IMPLEMENTING BEAM SCANNING AND COMMUNICATION

(71) Applicant: ZTE CORPORATION, Guangdong (CN)

(72) Inventors: Yong Yu, Guangdong (CN); Ping Li, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 433 days.

(21) Appl. No.: 17/622,797

(22) PCT Filed: May 14, 2020

(86) PCT No.: PCT/CN2020/090282
§ 371 (c)(1),
(2) Date: Dec. 24, 2021

(87) PCT Pub. No.: WO2020/259117
PCT Pub. Date: Dec. 30, 2020

(65) Prior Publication Data
US 2022/0247458 A1     Aug. 4, 2022

(30) Foreign Application Priority Data
Jun. 27, 2019     (CN) .......................... 201910566039.2

(51) Int. Cl.
*H04B 7/0408*     (2017.01)
*H04B 7/0417*     (2017.01)
(Continued)

(52) U.S. Cl.
CPC ......... *H04B 7/0408* (2013.01); *H04B 7/0417* (2013.01); *H04B 7/0632* (2013.01); *H04B 7/0695* (2013.01); *H04B 7/088* (2013.01)

(58) Field of Classification Search
CPC .. H04B 7/0408; H04B 7/0417; H04B 7/0632; H04B 7/0695; H04B 7/088; H04B 7/063; H04L 1/1819; H04L 1/20
See application file for complete search history.

(56) References Cited

U.S. PATENT DOCUMENTS 11,523,427 B2 * 12/2022 Lee ...................... H04B 7/0695
2008/0267168 A1   10/2008 Cai et al.
(Continued)

FOREIGN PATENT DOCUMENTS

| CN | 102598533 A | 7/2012 |
| CN | 104205911 A | 12/2014 |

(Continued)

OTHER PUBLICATIONS

First Chinese Office Action mailed Mar. 29, 2023 in corresponding Chinese Application No. 201910566039.2, translated, 13 pages.
(Continued)

*Primary Examiner* — Chirag G Shah
*Assistant Examiner* — Joshua Smith
(74) *Attorney, Agent, or Firm* — MH2 TECHNOLOGY LAW GROUP LLP

(57) ABSTRACT

Disclosed in embodiments of the present disclosure are a method, apparatus and a system for implementing beam scanning and communication. The method includes: sending, in an i-th transmission, P first transmission blocks on M1 time-frequency resources by using a first beam group including N1 beams, where the P first transmission blocks are transmission blocks obtained based on a second transmission block and in a same coding redundancy version or different coding redundancy versions; and determining a second beam group and Q third transmission blocks for a (i+1)-th transmission according to whether feedback information is received, and sending the Q third transmission
(Continued)

blocks on M2 time-frequency resources by using the second beam group for the (i+1)-th transmission, where the feedback information or a transmission failure identifier is received by using beams in the first beam group.

24 Claims, 3 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 2012/0294210 | A1 | 11/2012 | Jiang et al. |
| 2015/0341105 | A1 | 11/2015 | Yu et al. |
| 2018/0091262 | A1* | 3/2018 | Jung .................... H04L 1/1893 |
| 2018/0103464 | A1* | 4/2018 | John Wilson ........ H04B 7/0695 |
| 2018/0131434 | A1 | 5/2018 | Islam et al. |
| 2018/0192371 | A1* | 7/2018 | Jung .................... H04B 7/0617 |
| 2018/0206244 | A1 | 7/2018 | Yang et al. |
| 2018/0241494 | A1 | 8/2018 | Chendamarai Kannan et al. |
| 2019/0306847 | A1* | 10/2019 | Seo ...................... H04B 7/0417 |
| 2020/0007196 | A1* | 1/2020 | Cao ...................... H04B 7/0408 |
| 2020/0120704 | A1* | 4/2020 | Wang .................. H04B 7/0695 |
| 2020/0145079 | A1* | 5/2020 | Marinier ............. H04B 7/0695 |
| 2020/0162954 | A1* | 5/2020 | Seo ...................... H04B 7/0695 |
| 2020/0359366 | A1* | 11/2020 | Kim .................... H04B 7/0695 |

FOREIGN PATENT DOCUMENTS

| | | |
|---|---|---|
| CN | 105723752 A | 6/2016 |
| CN | 106464320 A | 2/2017 |
| CN | 106465148 A | 2/2017 |
| CN | 106559114 A | 4/2017 |
| CN | 106664127 A | 5/2017 |
| CN | 106856611 A | 6/2017 |
| CN | 106879010 A | 6/2017 |
| CN | 106888042 A | 6/2017 |
| CN | 106982184 A | 7/2017 |
| CN | 107113041 A | 8/2017 |
| CN | 107371245 A | 11/2017 |
| CN | 107395261 A | 11/2017 |
| CN | 107852683 A | 3/2018 |
| CN | 107888240 A | 4/2018 |
| CN | 107888258 A | 4/2018 |
| CN | 107896121 A | 4/2018 |
| CN | 107896122 A | 4/2018 |
| CN | 107925458 A | 4/2018 |
| CN | 108023628 A | 5/2018 |
| CN | 108169710 A | 6/2018 |
| CN | 108282215 A | 7/2018 |
| CN | 108631970 A | 10/2018 |
| CN | 108633068 A | 10/2018 |
| CN | 108702184 A | 10/2018 |
| CN | 108809369 A | 11/2018 |
| CN | 108880630 A | 11/2018 |
| CN | 109004958 A | 12/2018 |
| CN | 109076358 A | 12/2018 |
| CN | 109076548 A | 12/2018 |
| CN | 109089269 A | 12/2018 |
| CN | 109143219 A | 1/2019 |
| CN | 109219151 A | 1/2019 |
| EP | 3700101 A1 | 8/2020 |
| IN | 108111274 A | 6/2018 |
| WO | 2016141796 A | 9/2016 |
| WO | 2019078661 A1 | 4/2019 |

OTHER PUBLICATIONS

ZTE Corporation, International Search Report with English Translation, PCT/CN2020/090282, Jun. 30, 2020, 6 pgs.
ZTE Corporation, Extended European Search Report, EP 20831820.4, Jun. 28, 2022, 8 pgs.
European Patent Office Communication pursuant to Article 94(3) EPC, dated Feb. 29, 2024, in corresponding European Application No. 20831820.4, 5 pages.

* cited by examiner

METHOD AND APPARATUS FOR IMPLEMENTING BEAM SCANNING AND COMMUNICATION

CROSS REFERENCE TO RELATED APPLICATIONS

The present application is a United States National Stage Application filed under 35 U.S.C. § 371 of PCT Patent Application Serial No. PCT/CN2020/090282, filed on May 14, 2020, which claims priority to Chinese Patent Application No. 201910566039.2, filed on Jun. 27, 2019, each of which is incorporated by reference herein in its entirety.

TECHNICAL FIELD

The embodiments of the present disclosure relate to, but are not limited to, a wireless communication technology, in particular to a method and an apparatus for implementing beam scanning and communication.

BACKGROUND

In mobile communication, in order to overcome increased path loss caused by the communication in higher frequency band, a massive array antenna has become an indispensable key technology for a mobile communication system. In order to obtain a weight and channel quality information of beamforming in the massive array antenna, a beam scanning and a beam-based channel quality detection are essential technologies for the next generation mobile communication.

The conventional beam scanning and communication process is shown in FIG. 1, which roughly includes the following steps.

In step 1, a sending end uses a plurality of scanning beams to send pilot signals alternately. A receiving end uses a plurality of beams to receive the pilot signals alternately, performs a coarse synchronization, and calculates the channel quality of the beams.

In step 2, the receiving end feeds back one or more optimal scanning beams and channel quality of the sending end. The sending end receives based on original scanning beams to obtain the information of the optimal beam reported by the receiving end.

In step 3, the sending end and the receiving end perform processes including a time-frequency deviation fine synchronization, self-adaptive data transmission and the like based on the optimal beams.

In the conventional beam scanning and communication technology, a beam detection is performed first to pair beams of the sending end and the receiving end, and then a data communication is performed based on the paired beams. This often requires a long time for beam scanning, and the communication efficiency is low.

SUMMARY

Some embodiments of the present disclosure provide a method and apparatus for implementing beam scanning and communication.

Some embodiments of the present disclosure provide a method for implementing beam scanning and communication, including:

sending, in an i-th transmission, P first transmission blocks on M1 time-frequency resources by using a first beam group including N1 beams; where the P first transmission blocks are transmission blocks obtained based on a second transmission block and in a same coding redundancy version or different coding redundancy versions, and the i, M1, N1 and P are integers greater than or equal to 1; and determining a second beam group and Q third transmission blocks for a (i+1)-th transmission according to whether feedback information or a transmission failure identifier is received, and sending the Q third transmission blocks on M2 time-frequency resources by using the second beam group for the (i+1)-th transmission; where the feedback information or the transmission failure identifier is received by using beams in the first beam group, and the M2 and Q are integers greater than or equal to 1.

Some embodiments of the present disclosure provide a method for implementing beam scanning and communication, including:

decoding, in an i-th transmission, P first transmission blocks received on M1 time-frequency resources by using a third beam group including N2 beams to obtain a decoding result of the i-th transmission; where, the P first transmission blocks are transmission blocks obtained based on a second transmission block and in a same coding redundancy version or different coding redundancy versions, and the i, M1, N2 and P are integers greater than or equal to 1; and determining whether to send feedback information or a transmission failure identifier according to the decoding result of the i-th transmission.

Some embodiments of the present disclosure provide an apparatus for implementing beam scanning and communication, including a processor and a computer-readable storage medium in which instructions are stored. The instructions, when executed by the processor, implement any of the above methods for implementing the beam scanning and communication.

Some embodiments of the present disclosure provide a computer-readable storage medium on which a computer program is stored. The computer program, when executed by a processor, implements the steps of any of the above method for implementing the beam scanning and communication.

Some embodiments of the present disclosure provide an apparatus for implementing beam scanning and communication, including:

a first transmission module, configured to send, in an i-th transmission, P first transmission blocks on M1 time-frequency resources by using a first beam group including N1 beams; where the P first transmission blocks are transmission blocks obtained based on a second transmission block and in a same coding redundancy version or different coding redundancy versions, and the i, M1, N1 and P are integers greater than or equal to 1; and determine a second beam group and Q third transmission blocks for a (i+1)-th transmission according to whether feedback information is received, and send the Q third transmission blocks on M2 time-frequency resources by using the second beam group for the (i+1)-th transmission; where the feedback information or the transmission failure identifier is received by using beams in the first beam group, and the M2 and Q are integers greater than or equal to 1.

Some embodiments of the present disclosure provide an apparatus for implementing beam scanning and communication, including:

a second transmission module, configured to decode, in an i-th transmission, P first transmission blocks received on M1 time-frequency resources by using a third beam group including N2 beams to obtain a decoding result of the i-th transmission; where, the P first transmission blocks are transmission blocks obtained based on a second transmission block and in a same coding redundancy version or different coding redundancy versions, and the M1, N2 and P are integers greater than or equal to 1; and determine whether to send feedback information according to the decoding result of the i-th transmission.

Some embodiments of the present disclosure provide a system for implementing beam scanning and communication, including:

a first node, configured to send, in an i-th transmission, P first transmission blocks on M1 time-frequency resources by using a first beam group including N1 beams; where the P first transmission blocks are transmission blocks obtained based on a second transmission block and in a same coding redundancy version or different coding redundancy versions, and the M1, N1 and P are integers greater than or equal to 1; and determine a second beam group and Q third transmission blocks for a (i+1)-th transmission according to whether feedback information or a transmission failure identifier is received, and send the Q third transmission blocks on M2 time-frequency resources by using the second beam group for the (i+1)-th transmission; where the feedback information or the transmission failure identifier is received by using beams in the first beam group, and the M2 and Q are integers greater than or equal to 1; and a second node, configured to decode, in the i-th transmission, the P first transmission blocks received on the M1 time-frequency resources by using a third beam group including N2 beams to obtain a decoding result of the i-th transmission; and determine whether to send the feedback information or the transmission failure identifier according to the decoding result of the i-th transmission Other features and advantages of the present disclosure will be described in the following description, and partly become obvious from the description, or understood by implementing the embodiments of the present disclosure. The purpose and other advantages of the present disclosure may be realized and obtained through a structure specifically pointed out in the description, claims and drawings.

BRIEF DESCRIPTION OF THE DRAWINGS

The accompanying drawings are used to provide a further understanding of the technical solution of embodiments of the present disclosure, and constitute a part of the description. Together with the embodiments of the present disclosure, they are used to explain the technical solution of the present disclosure, and do not constitute a limitation to the technical solution of the embodiments of the present disclosure.

DETAILED DESCRIPTION

The embodiments of the present disclosure will be described in detail below with reference to the accompanying drawings. It should be noted that the embodiments in the present disclosure and the features in the embodiments may be combined with each other randomly, in the case of no conflict.

The steps shown in the flowcharts of the accompanying drawings may be executed in a computer system including such as a set of computer-executable instructions. Although a logical order is shown in the flowcharts, in some cases, the steps shown or described may be executed in a order different than here.

Figure 1:
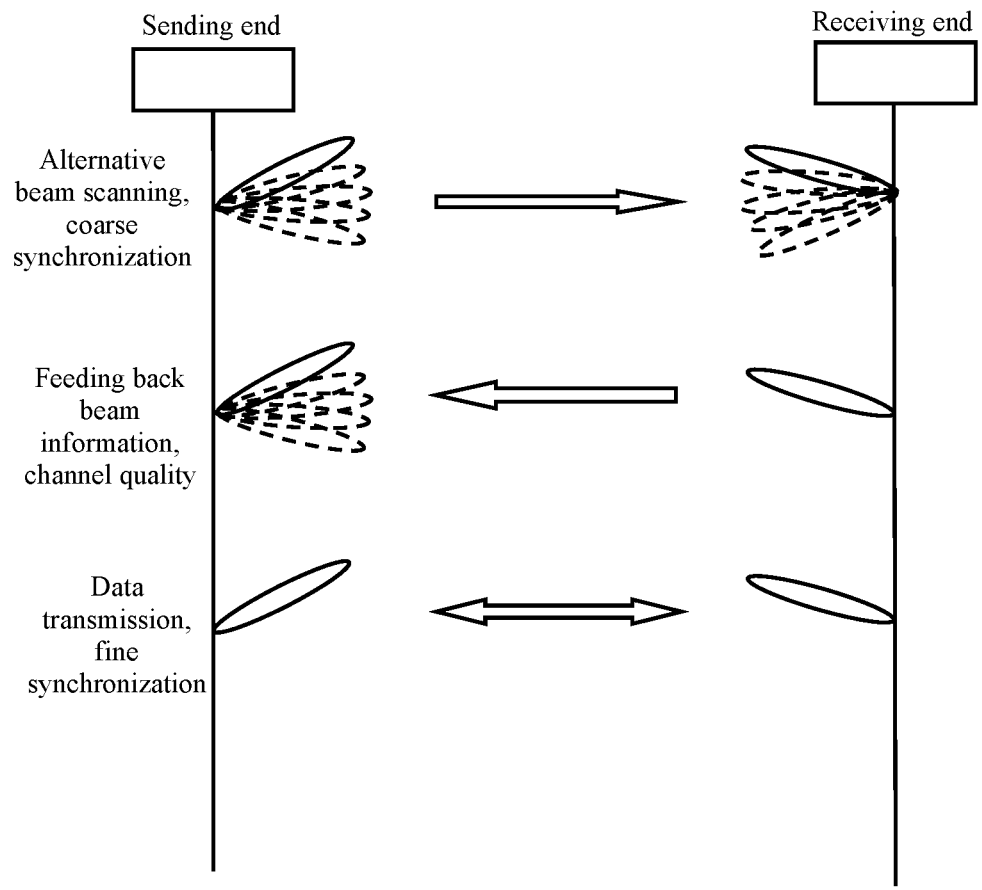
FIG. 1 is a schematic diagram of a conventional beam scanning and communication process.
Figure 2:
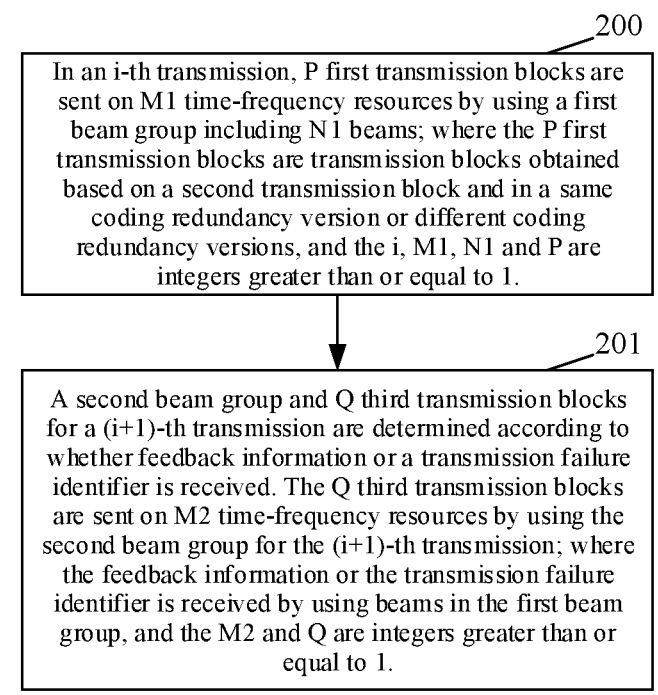
FIG. 2 is a flow chart of a method for implementing beam scanning and communication according to an embodiment of the present disclosure.

Referring to FIG. 2, an embodiment of the present disclosure provides a method for implementing beam scanning and communication, which is applied to a first node. The first node may be any communication node, such as a base station, a mobile terminal, a tablet computer, or other wireless communication devices, etc. The method includes the following steps.

In step 200, in an i-th transmission, P first transmission blocks are sent on M1 time-frequency resources by using a first beam group including N1 beams; where the P first transmission blocks are transmission blocks obtained based on a second transmission block and in a same coding redundancy version or different coding redundancy versions, and the i, M1, N1 and P are integers greater than or equal to 1.

In the embodiment of the present disclosure, orientations of the N1 beams may be the same or different. The embodiment of the present disclosure does not limit the specific orientations of the N1 beams.

In the embodiments of the present disclosure, when the P first transmission blocks include transmission blocks in different coding redundancy versions, the communication performance is improved.

In the embodiment of the present disclosure, the M1, N1 and P may be pre-agreed for a first transmission, and may be semi-statically or dynamically configured by a signaling from a second transmission.

In the embodiments of the present disclosure, sending the P first transmission blocks on the M1 time-frequency resources by using the first beam group including the N1 beams includes any one of the following:

sending one or N2 first transmission blocks on a same time-frequency resource by using each beam in the first beam group; where the N2 is a number of beams in a third beam group used by a receiving end for performing reception; that is, sending N1×N2 first transmission blocks on a same time-frequency resource, and one beam in the first beam group corresponds to N2 first transmission blocks; or, sending N1 first transmission blocks on a same time-frequency resource, and one beam in the first beam group corresponds to one first transmission block;

sending one or N2 first transmission blocks on the M1 time-frequency resources by using each beam in the first beam group; that is, sending one or more first transmission blocks on a same time-frequency resource, and sending the N1 or N1×N2 first transmission blocks on the M1 time-frequency resources in total, one beam in the first beam group corresponds to one or N2 first transmission blocks; or sending one first transmission block on each one of N1×N2 time-frequency resources by using each beam in the first beam group; that is, sending one first transmission block on a same time-frequency resource, and sending a total of N1×N2 first transmission blocks on N1×N2 time-frequency resources, one beam corresponds to the N2 first transmission blocks.

In the embodiment of the present disclosure, the coding redundancy versions corresponding to the first transmission blocks sent on a same time-frequency resource may be identical or different. The coding redundancy versions corresponding to the first transmission blocks sent on different time-frequency resources may be identical or different.

The coding redundancy versions corresponding to the first transmission blocks sent by a same beam in the first beam group may be identical or different. The coding redundancy versions corresponding to the first transmission blocks sent by different beams in the first beam group may be identical or different.

In the embodiments of the present disclosure, the time-frequency resources include time-domain resources (such as symbols, time slots, etc.) and frequency-domain resources (such as carrier frequencies, etc.).

In step 201, a second beam group and Q third transmission blocks for a (i+1)-th transmission are determined according to whether feedback information or a transmission failure identifier is received. The Q third transmission blocks are sent on M2 time-frequency resources by using the second beam group for the (i+1)-th transmission; where the feedback information or the transmission failure identifier is received by using beams in the first beam group, and the M2 and Q are integers greater than or equal to 1.

In the embodiments of the present disclosure, determining the second beam group and the Q third transmission blocks for the (i+1)-th transmission according to whether the feedback information or the transmission failure identifier is received includes at least one of the following:

when the feedback information is received by using at least one beam in the first beam group, determining the second beam group for the (i+1)-th transmission according to the feedback information, and determining that the third transmission blocks are transmission blocks obtained based on a fourth transmission block and in a same coding redundancy version or different coding redundancy versions; where, the feedback information includes a transmission success identifier, a number of first transmission blocks which are successfully decoded, and a first correspondence relationship between a signal quality or a signal quality difference of the first transmission blocks which are successfully decoded and first beam identifiers; and in this case, if the first transmission blocks are successfully transmitted, then the third transmission blocks sent in the (i+1)-th transmission are the transmission blocks obtained based on the fourth transmission block and in a same coding redundancy version or different coding redundancy versions, that is, new transmission blocks are sent; or when the feedback information is not received by using any beam in the first beam group, or the transmission failure identifier is received by using at least one beam in the first beam group, determining that the second beam group for the (i+1)-th transmission is the first beam group, and determining that the third transmission blocks are transmission blocks obtained based on the second transmission block and in a same coding redundancy version or different coding redundancy versions, and coding redundancy versions corresponding to the third transmission blocks being identical to or different from the coding redundancy versions corresponding to the first transmission blocks.

In an exemplary example, when the feedback information is received by using the at least one beam in the first beam group, the method further includes:

adjusting a modulation and coding level for the (i+1)-th transmission according to the signal quality of the first transmission blocks which are successfully decoded.

It is certain that the modulation and coding level for the (i+1)-th transmission may not be adjusted, which is not limited by the embodiments of the present disclosure.

In an exemplary example, adjusting the modulation and coding level for the (i+1)-th transmission according to the signal quality of the first transmission blocks which are successfully decoded includes:

searching a modulation and coding level corresponding to the signal quality of the first transmission blocks which are successfully decoded according to a preset second correspondence relationship between modulation and coding levels and signal quality, and adjusting the modulation and coding level modulation for the (i+1)-th transmission to a searched modulation and coding level.

In an exemplary example, determining the second beam group for the (i+1)-th transmission according to feedback information includes:

determining the second beam group for the (i+1)-th transmission according to the number of the first transmission blocks which are successfully decoded and the first correspondence relationship.

In an exemplary example, determining the second beam group for the (i+1)-th transmission according to the number of the first transmission blocks which are successfully decoded and the first correspondence relationship includes at least one of the following:

when the number of the first transmission blocks which are successfully decoded is 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or when the number of the first transmission blocks which are successfully decoded is greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

In an exemplary example, a beam with the optimal signal quality in the first beam group is the optimal beam; or, a potential optimal beam is fitted by interpolation and according to the signal quality difference between adjacent beams reported by the receiving end.

According to the embodiments of the present disclosure, a beam scanning process and a communication process are simplified into one process, that is, the communication is performed at the same time of the beam scanning, rather than not performed until the end of the beam scanning. In this way, communication efficiency is improved.

Figure 3:
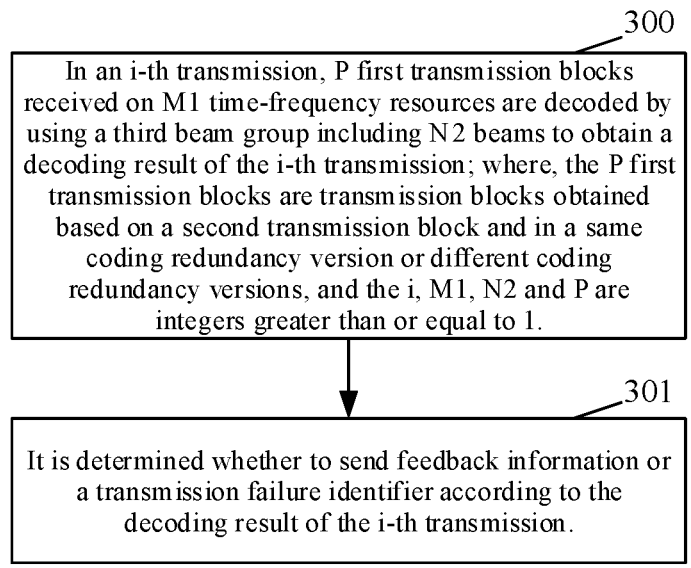
FIG. 3 is a flow chart of a method for implementing beam scanning and communication according to another embodiment of the present disclosure.

Referring to FIG. 3, another embodiment of the present disclosure provides a method for implementing beam scanning and communication, which is applied to a second node. The second node may be any communication node, such as a base station, a mobile terminal, a tablet computer, or other wireless communication devices, etc. The method includes the following steps.

In step 300, in an i-th transmission, P first transmission blocks received on M1 time-frequency resources are decoded by using a third beam group including N2 beams to obtain a decoding result of the i-th transmission; where, the P first transmission blocks are transmission blocks obtained based on a second transmission block in a same coding redundancy version or different coding redundancy versions, and the i, M1, N2 and P are integers greater than or equal to 1.

In the embodiment of the present disclosure, decoding the P first transmission blocks received on the M1 time-frequency resources by using the third beam group including the N2 beams to obtain the decoding result of the i-th transmission includes at least one of the following:

decoding the P first transmission blocks independently by using beams in the third beam group, and when an independent decoding of at least one first transmission block is successful by using at least one beam in the third beam group, determining the decoding result of the i-th transmission as a decoding success; or when an independent decoding of any one of the first transmission blocks is unsuccessful by all the beams in the third beam group, determining the decoding result of the i-th transmission as a decoding failure.

Alternatively, decoding the P first transmission blocks received on the M1 time-frequency resources by using the third beam group including the N2 beams to obtain the decoding result of the i-th transmission includes at least one of the following:

decoding the P first transmission blocks independently by using the beams in the third beam group, and when the independent decoding of the at least one first transmission block is successful by using the at least one beam in the third beam group, determining the decoding result of the i-th transmission as the decoding success;

when an independent decoding of any one of the first transmission blocks is unsuccessful by all the beams in the third beam group, performing a first joint decoding on the P first transmission blocks by using the beams in the third beam group, and when the first joint decoding is successful, determining the decoding result of the i-th transmission as the decoding success; and when the first joint decoding fails, determining the decoding result of the i-th transmission as the decoding failure.

Alternatively, decoding the P first transmission blocks received on the M1 time-frequency resources by using the third beam group including the N2 beams to obtain the decoding result of the i-th transmission includes at least one of the following:

decoding the P first transmission blocks independently by using the beams in the third beam group, and when the independent decoding of the at least one first transmission block is successful by using the at least one beam in the third beam group, determining the decoding result of the i-th transmission as the decoding success;

when an independent decoding of any one of the first transmission blocks is unsuccessful by all the beams in the third beam group, performing the first joint decoding on the P first transmission blocks by using the beams in the third beam group, and when the first joint decoding is successful, determining the decoding result of the i-th transmission as the decoding success; and when the first joint decoding fails, performing a second joint decoding on the P first transmission blocks and part of or all transmission blocks received from a first transmission to an (i−1)-th transmission by using the beams in the third beam group; when the second joint decoding is successful, determining the decoding result of the i-th transmission as the decoding success; or when the second joint decoding fails, determining the decoding result of the i-th transmission as the decoding failure.

In an exemplary example, when the P first transmission blocks are independently decoded by using the beams in the third beam group, if a sending end sends one first transmission block by using each beam in the first beam group, then a receiving end independently decodes each received first transmission block by using the N2 beams in the third beam group. If the sending end sends N2 first transmission blocks by using the each beam in the first beam group, the receiving end independently decodes the N2 first transmission blocks of the P first transmission blocks sent by using a same beam in the first beam group by using N2 beams in the third beam group, respectively, and each beam in the third beam group corresponds to one of the N2 first transmission blocks sent by using a same beam in the first beam group.

In an exemplary example, when a first joint decoding is performed on the P first transmission blocks by using the beams in the third beam group, the P first transmission blocks are grouped in pairs, and joint decoding is performed on each group of two first transmission blocks by using each beam in the third beam group, respectively. When the joint decoding performed on at least one group of two first transmission blocks by using at least one beam in the third beam group succeeds, the first joint decoding succeeds.

When the joint decoding performed on all groups of two first transmission blocks by using all beams in the third beam group fails, every three first transmission blocks of the P first transmission blocks are divided into a group, and joint decoding is performed on each group of three first transmission blocks by using each beam in the third beam group, respectively. When the joint decoding performed on at least one group of three first transmission blocks by using at least one beam in the third beam group succeeds, the first joint decoding succeeds.

By analogy, when the joint decoding performed on all groups of P−1 first transmission blocks by using all beams in the third beam group fails, joint decoding is performed on the P first transmission blocks by using each beam in the third beam group, respectively. When the joint decoding performed on the P first transmission blocks by using at least one beam in the third beam group succeeds, the first joint decoding succeeds.

When the joint decoding performed on the P first transmission blocks by using all beams in the third beam group fails, the first joint decoding fails.

In an exemplary example, when performing the second joint decoding on the P first transmission blocks and all transmission blocks received from the first transmission to the (i−1)-th transmission by using the beams in the third beam group, a joint decoding is performed first on the P first transmission blocks and all the transmission blocks received in the (i−1)-th transmission by using the beams in the third beam group. When the joint decoding performed on the P first transmission blocks and all the transmission blocks received in the (i−1)-th transmission by using at least one beam in the third beam group succeeds, the second joint decoding succeeds.

When the joint decoding performed on P first transmission blocks and all the transmission blocks received in the (i−1)-th transmission by using all beams in the third beam group fails, joint decoding is performed on the P first transmission blocks and all the transmission blocks received in the (i−1)-th and (i−2)-th transmissions by using the beams in the third beam group. When the joint decoding performed on the P first transmission blocks and all the transmission blocks received in the (i−1)-th and (i−2)-th transmissions by using at least one beam in the third beam group succeeds, the second joint decoding succeeds.

By analogy, when the joint decoding performed on the P first transmission blocks and all the transmission blocks received from a 2nd transmission to the (i−1)-th transmission by using all the beams in the third beam group fails, a joint decoding is performed on the P first transmission blocks and all the transmission blocks received from the first transmission to the (i−1)-th transmission by using the beams in the third beam group. When the joint decoding performed on the P first transmission blocks and all the transmission blocks received form the first transmission to the (i−1)-th transmission by using at least one beam in the third beam group succeeds, the second joint decoding succeeds.

When the joint decoding performed on the P first transmission blocks and all the transmission blocks received from the first transmission to the (i−1)-th transmission by using all beams in the third beam group fails, the second joint decoding fails.

In step 301, it is determined whether to send feedback information or a transmission failure identifier according to the decoding result of the i-th transmission.

In the embodiments of the present disclosure, determining whether to send the feedback information according to whether the decoding succeeds includes at least one of the following:
- when the decoding result of the i-th transmission is a decoding failure, not sending the feedback information or sending the transmission failure identifier; or
- when the decoding result of the i-th transmission is a decoding success, calculating a signal quality of first transmission blocks which are successfully decoded; determining an optimal beam in the third beam group according to the signal quality of the first transmission blocks which are successfully decoded, and sending the feedback information by using the optimal beam in the third beam group; where, the feedback information includes a transmission success identifier, a number of the first transmission blocks which are successfully decoded, and a first correspondence relationship between the signal quality or a signal quality difference of the first transmission blocks which are successfully decoded and beam identifiers of the beams in a first beam group.

In an exemplary example, a beam identifier may be represented explicitly or implicitly (for example, represented by a series number of a time-frequency resource block configured to receive the first transmission block).

In an exemplary example, the signal quality for example refers to a signal strength, or a signal-to-noise ratio, etc.

In an exemplary example, a signal quality difference of a certain first transmission block refers to a difference between a signal quality of this first transmission block and a signal quality of another first transmission block.

In an exemplary example, the transmission success identifier or the transmission failure identifier is sent separately, or is sent together with the number of the first transmission blocks which are successfully decoded and the correspondence relationship.

According to the embodiments of the present disclosure, a beam scanning process and a communication process are simplified into one process, that is, the communication is performed at the same time of the beam scanning, rather than not performed until the end of the beam scanning. In this way, the communication efficiency is improved.

The specific implementation process of the method for implementing the beam scanning and communication according to the above embodiments will be described in detail by specific examples below. The provided examples are merely for convenience of illustration and may not be used to limit the protection scope of the method in the embodiments of the present disclosure.

In the next generation mobile communication system, higher frequency bands (e.g. new frequency bands of 4-6 GHz, 28 GHz, 38 GHz, 57-64 GHz or 71-76 GHz) are generally used as a spectrum for 5G mobile communication. A beam scanning technology is applied in order to overcome the increased path loss caused by the communication in higher frequency bands. In the next generation mobile communication system, the beam scanning may be implemented in the following ways.

Embodiment 1

It is assumed that within a coverage area for a cell, eight beams in a first beam group are used for coverage, and only one beam in a third beam group for a terminal is used to send and receive data. It is assumed that there are four coding redundancy versions for each second transmission block. The method for fast beam scanning and communication is as follows.

In step 400, when data is transmitted between a base station and the terminal for the first time, a second transmission block has four coding redundancy versions, which are sent alternately on eight different time-frequency resources by using eight beams in the first beam group.

For example, one coding redundancy version corresponds to two time-frequency resources, and one time-frequency resource corresponds to one beam in the first beam group. As shown in Table 1, a first transmission block in a coding redundancy version 1 is sent on a time-frequency resource 1 by using a beam 1 in the first beam group. A first transmission block in a coding redundancy version 2 is sent on a time-frequency resource 2 by using a beam 2 in the first beam group. A first transmission block in a coding redundancy version 3 is sent on a time-frequency resource 3 by using a beam 3 in the first beam group. A first transmission block in a coding redundancy version 4 is sent on a time-frequency resource 4 by using a beam 4 in the first beam group. The first transmission block in the coding redundancy version 1 is sent on a time-frequency resource 5 by using a beam 5 in the first beam group. The first transmission block in the coding redundancy version 2 is sent on a time-frequency resource 6 by using a beam 6 in the first beam group. The first transmission block in the coding redundancy version 3 is sent on a time-frequency resource 7 by using a beam 7 in the first beam group. The first transmission block in the coding redundancy version 4 is sent on a time-frequency resource 8 by using a beam 8 in the first beam group.

TABLE 1

Relationship among time-frequency resources on the sending end, first beams and coding redundancy versions

| Series numbers of time-frequency resources | Series numbers of the beams on sending end | Series numbers of coding redundancy versions |
|---|---|---|
| 1 | 1 | 1 |
| 2 | 2 | 2 |
| 3 | 3 | 3 |
| 4 | 4 | 4 |
| 5 | 5 | 1 |
| 6 | 6 | 2 |
| 7 | 7 | 3 |
| 8 | 8 | 4 |

In step 401, the terminal performs an independent detection and decoding on the eight different time-frequency resources by using a same beam in the third beam group. For the first transmission blocks of which the independent decoding succeeds, a signal quality of the first transmission blocks is calculated.

When the independent decoding performed by the terminal on the eight different time-frequency resources by using a same beam in the third beam group fails, the terminal performs a joint decoding on every two first transmission blocks by using a same beam in the third beam group. For the every two first transmission blocks of which the joint decoding succeeds, a signal quality of the every two first transmission blocks of which the joint decoding succeeds is calculated.

When the joint decoding performed by the terminal on every two first transmission blocks by using a same beam in the third beam group fails, the terminal performs a joint decoding on every three first transmission blocks by using a same beam in the third beam group. For the every three first transmission blocks of which the joint decoding succeeds, a signal quality of the every three first transmission blocks of which the joint decoding succeeds is calculated.

When the joint decoding performed by the terminal on every three first transmission blocks by using a same beam in the third beam group fails, the terminal performs a joint decoding on every four first transmission blocks by using a same beam in the third beam group. For the every four first transmission blocks of which the joint decoding succeeds, a signal quality of the every four first transmission blocks of which the joint decoding succeeds is calculated.

When the joint decoding performed by the terminal on every four first transmission blocks by using a same beam in the third beam group fails, the terminal performs a joint decoding on every five first transmission blocks by using a same beam in the third beam group. For the every five first transmission blocks of which the joint decoding succeeds, a signal quality of the every five first transmission blocks of which the joint decoding succeeds is calculated.

When the joint decoding performed by the terminal on every five first transmission blocks by using a same beam in the third beam group fails, the terminal performs a joint decoding on every six first transmission blocks by using a same beam in the third beam group. For the every six first transmission blocks of which the joint decoding succeeds, a signal quality of the every six first transmission blocks of which the joint decoding succeeds is calculated.

When the joint decoding performed by the terminal on every six first transmission blocks by using a same beam in the third beam group fails, the terminal performs a joint decoding on every seven first transmission blocks by using a same beam in the third beam group. For the every seven first transmission blocks of which the joint decoding succeeds, a signal quality of the every seven first transmission blocks of which the joint decoding succeeds is calculated.

When the joint decoding performed by the terminal on every seven first transmission blocks by using a same beam in the third beam group fails, the terminal performs a joint decoding on eight first transmission blocks by using a same beam in the third beam group. For the eight first transmission blocks of which the joint decoding succeeds, a signal quality of the eight first transmission blocks of which the joint decoding succeeds is calculated.

When the joint decoding performed by the terminal on the eight first transmission blocks by using a same beam in the third beam group fails, the decoding fails.

In step 402, when the decoding succeeds, the terminal sends feedback information to the base station. The feedback information includes a transmission success identifier, a number of first transmission blocks which are successfully decoded, and a first correspondence relationship between a signal quality or a signal quality difference of the first transmission blocks which are successfully decoded and beam identifiers of the beams in the first beam group. When decoding fails, the terminal does not send the feedback information or sends a transmission failure identifier.

In this step, the transmission success identifier or the transmission failure identifier may be sent separately, or may be sent together with the number of the first transmission blocks which are successfully decoded and the first correspondence relationship.

In this step, the signal quality for example refers to a signal strength, or a signal-to-noise ratio, etc.

In this step, a signal quality difference of a certain first transmission block refers to a difference between a signal quality of this first transmission block and a signal quality of another first transmission block.

In step 403, the base station receives the feedback information of the terminal alternately by using the 8 beams in the first beam group. When the feedback information is received, a next transmission is performed according to the feedback information sent by the terminal. When the feedback information is not received or the transmission failure identifier is received, it indicates that the transmission fails, and then a transmission of the first transmission blocks in the original 4 coding redundancy versions is repeated on the 8 time-frequency resources by using the 8 beams in the first beam group alternately.

In this step, if the terminal reports an independent decoding success of one first transmission block, a beam corresponding to the only reported first transmission block which is successfully decoded is used as a sending beam for a next transmission of new data. Alternatively, according to the reported beam information, five adjacent beams are interpolated, near the beam corresponding to the only reported first transmission block which is successfully decoded, as subdivided beams for alternative scanning and as the sending beams for the next transmission of new data. And a modulation and coding level of the data newly sent in the next transmission is adjusted according to a signal quality of the beam corresponding to the reported first transmission block which is successfully decoded.

If the terminal reports a success of independent decoding or joint decoding of a plurality of first transmission blocks, an orientation of an optimal beam is calculated according to a signal quality or a signal quality difference of beams corresponding to the reported plurality of first transmission blocks which are successfully decoded, and the optimal beam is taken as the sending beam for a next transmission of new data. Alternatively, according to the calculated orientation of the optimal beam, five adjacent first beams are selected as subdivided beams for alternative scanning and as beams for alternative sending for the next transmission of new data. The modulation and coding level of the data newly sent in the next transmission is adjusted according to the signal quality or the signal quality difference of the beams corresponding to the reported first transmission blocks which are successfully decoded.

Embodiment 2

It is assumed that within a coverage area for a cell, 8 wide beams or 32 narrow beams are used for coverage (1 wide beam corresponds to 4 narrow beams), and a terminal uses 8 beams in a third beam group to send and receive data. It is assumed that there are four coding redundancy versions for each second transmission block. The method for fast beam scanning and communication is as follows.

In step 500, when data is transmitted between a base station and the terminal for the first time, a second transmission block has four coding redundancy versions, which are sent alternately on 64 different time-frequency resources by using the 8 wide beams (that is, the beams in the first beam group).

For example, one coding redundancy version corresponds to 16 time-frequency resources, and 8 time-frequency resources correspond to one wide beam. As shown in Table 2, a first transmission block in a coding redundancy version 1 is sent on time-frequency resources 1, 9, 17, 25, 33, 41, 49 and 57 by using a wide beam 1. A first transmission block in a coding redundancy version 2 is sent on time-frequency resources 2, 10, 18, 26, 34, 42, 50 and 58 by using a wide beam 2. A first transmission block in a coding redundancy version 3 is sent on time-frequency resources 3, 11, 19, 27, 35, 43, 51 and 59 by using a wide beam 3. A first transmission block in a coding redundancy version 4 is sent on time-frequency resources 4, 12, 20, 28, 36, 44, 52 and 60 by using a wide beam 4. The first transmission block in the coding redundancy version 1 is sent on time-frequency resources 5, 13, 21, 29, 37, 45, 53 and 61 by using a wide beam 5. The first transmission block in the coding redundancy version 2 is sent on time-frequency resources 6, 14, 22, 30, 38, 46, 54 and 62 by using a wide beam 6. The first transmission block in the coding redundancy version 3 is sent on time-frequency resources 7, 15, 23, 31, 39, 47, 55 and 63 by using a wide beam 7. The first transmission block in the coding redundancy version 4 is sent on time-frequency resources 8, 16, 24, 32, 40, 48, 56 and 64 by using a wide beam 8.

TABLE 2

Relationship among time-frequency resources on the sending end, first beams and coding redundancy versions

| Series numbers of time-frequency resources | Series numbers of the wide beams on sending end | Series numbers of coding redundancy versions |
| --- | --- | --- |
| 1, 9, 17, 25, 33, 41, 49, 57 | 1 | 1 |
| 2, 10, 18, 26, 34, 42, 50, 58 | 2 | 2 |
| 3, 11, 19, 27, 35, 43, 51, 59 | 3 | 3 |
| 4, 12, 20, 28, 36, 44, 52, 60 | 4 | 4 |
| 5, 13, 21, 29, 37, 45, 53, 61 | 5 | 1 |
| 6, 14, 22, 30, 38, 46, 54, 62 | 6 | 2 |
| 7, 15, 23, 31, 39, 47, 55, 63 | 7 | 3 |
| 8, 16, 24, 32, 40, 48, 56, 64 | 8 | 4 |

In step 501, the terminal decodes received first transmission blocks alternately on 64 different time-frequency resources by using the 8 beams in the third beam group.

For example, receiving is performed on 8 time-frequency resources by using one beam in the third beam group. As shown in Table 3, decoding is performed on the received first transmission block on time-frequency resources 1-8 by using a beam 1 in the third beam group. Decoding is performed on the received first transmission block on time-frequency resources 9-16 by using a beam 2 in the third beam group. Decoding is performed on the received first transmission block on time-frequency resources 17-24 by using a beam 3 in the third beam group. Decoding is performed on the received first transmission block on time-frequency resources 25-32 by using a beam 4 in the third beam group. Decoding is performed on the received first transmission block on time-frequency resources 33-40 by using a beam 5 in the third beam group. Decoding is performed on the received first transmission block on time-frequency resources 41-48 by using a beam 6 in the third beam group. Decoding is performed on the received first transmission block on time-frequency resources 49-56 by using a beam 7 in the third beam group. Decoding is performed on the received first transmission block on time-frequency resources 57-64 by using a beam 8 in the third beam group.

TABLE 3

Relationship between time-frequency resources on the receiving end and second beams

| Series numbers of time-frequency resources | Series numbers of the beams on receiving end |
| --- | --- |
| 1, 2, 3, 4, 5, 6, 7, 8 | 1 |
| 9, 10, 11, 12, 13, 14, 15, 16 | 2 |
| 17, 18, 19, 20, 21, 22, 23, 24 | 3 |
| 25, 26, 27, 28, 29, 30, 31, 32 | 4 |
| 33, 34, 35, 36, 37, 38, 39, 40 | 5 |
| 41, 42, 43, 44, 45, 46, 47, 48 | 6 |
| 49, 50, 51, 52, 53, 54, 55, 56 | 7 |
| 57, 58, 59, 60, 61, 62, 63, 64 | 8 |

The first transmission blocks in different coding redundancy versions and corresponding to different beams may be decoded independently or jointly. For the first transmission blocks of which independent decoding or joint decoding succeeds, the terminal calculates the signal quality of the first transmission blocks which are successfully decoded.

If an independent decoding performed by the terminal on 64 different time-frequency resources fails, the terminal performs a joint decoding on every two of the first transmission blocks of which the independent decoding fails in a same beam in the third beam group. For a plurality of first transmission blocks obtained by successful joint decoding of the joint decoding performed on every two first transmission blocks in a same beam in the third beam group, the signal quality of the first transmission blocks which are successfully decoded is calculated. When the joint decoding performed on every two first transmission blocks fails, a joint decoding on every three first transmission blocks is performed, and so on until a joint decoding on 64 first transmission blocks is performed.

In step 502, when the decoding succeeds, the terminal selects a first transmission block with the strongest signal quality among the first transmission blocks which are successfully decoded, and take the beam corresponding to the selected first transmission block as an optimal beam for sending and receiving for the terminal (that is, the optimal beam in the third beam group mentioned above). The terminal sends feedback information to the base station based on the optimal beam for sending and receiving. The feedback information includes a transmission success identifier, a number of first transmission blocks which are successfully decoded, and a first correspondence relationship between a signal quality or a signal quality difference of the first transmission blocks and beam identifiers of the beams in the first beam group. When decoding fails, the terminal does not send the feedback information.

In this step, the transmission success identifier may be sent separately, or may be sent together with the number of the first transmission blocks which are successfully decoded and the first correspondence relationship.

In this step, the signal quality for example refers to a signal strength, or a signal-to-noise ratio, etc.

In this step, a signal quality difference of a certain first transmission block refers to a difference between a signal quality of this first transmission block and a signal quality of another first transmission block.

In step 503, the base station receives the feedback information from the terminal alternately by using the eight wide beams. When the feedback information is received, the base station performs a next transmission according to the feedback information sent by the terminal. When the feedback information is not received or a transmission failure identifier is received, it indicates that the transmission fails, and then a transmission of 4 coding redundancy blocks is repeated on the 64 time-frequency resources by using the 8 wide beams alternately.

In this step, if the terminal reports an independent decoding success of one first transmission block, a wide beam corresponding to the only reported first transmission block which is successfully decoded is used as a sending beam for a next transmission of new data. Alternatively, according to the reported beam information, five adjacent wide beams are selected, near the wide beam corresponding to the only reported first transmission block which is successfully decoded, as subdivided beams for alternative scanning and as the sending beams for the next transmission of new data. And a modulation and coding level of the data newly sent in the next transmission is adjusted according to a signal quality of the wide beam corresponding to the reported first transmission block which is successfully decoded.

If the terminal reports a success of independent decoding or joint decoding of two or more first transmission blocks, an optimal beam in the first beam group is calculated according to the signal quality or a signal quality difference of the wide beams corresponding to the reported first transmission blocks which are successfully decoded, and the optimal beam is used as the sending beam for a next transmission of new data. Alternatively, according to the calculated optimal beam in the first beam group, five adjacent wide beams are selected as subdivided beams for alternative scanning, and as beams for alternative sending for the next transmission of new data. The modulation and coding level of the data newly sent in the next transmission is adjusted according to the signal quality of the wide beams corresponding to the reported first transmission blocks which are successfully decoded.

Embodiment 3

It is assumed that within a coverage area for a cell, 32 beams in a first beam group are used for coverage, and a terminal uses 8 beams in a third beam group to send and receive data. It is assumed that there are four coding redundancy versions for each first transmission block. The method for fast beam scanning and communication is as follows.

In step 600, when data is transmitted between a base station and the terminal for the first time, a same second transmission block has four coding redundancy versions, which are sent alternately on 256 different time-frequency resources by using the 32 beam. The beams in the first beam group that have adjacent series numbers are horizontally or vertically adjacent beams.

For example, one coding redundancy version corresponds to 64 time-frequency resources, and 8 time-frequency resources correspond to one first beam. As shown in Table 4, a first transmission block in a coding redundancy version 1 is sent on time-frequency resources 1, 33, 65, 97, 129, 161, 193 and 225 by using a beam numbered 1 in the first beam group. A first transmission block in a coding redundancy version 2 is sent on time-frequency resources 2, 34, 66, 98, 130, 162, 194 and 226 by using a beam numbered 2 in the first beam group. A first transmission block in a coding redundancy version 3 is sent on time-frequency resources 3, 35, 67, 99, 131, 163, 195 and 227 by using a beam numbered 3 in the first beam group. A first transmission block in a coding redundancy version 4 is sent on time-frequency resources 4, 36, 68, 100, 132, 164, 196 and 228 by using a beam numbered 4 in the first beam group, and so on.

TABLE 4

Relationship among time-frequency resources on the sending end, first beams and coding redundancy versions

| Series numbers of time-frequency resources | Series numbers of the beams on sending end | Series numbers of coding redundancy versions |
|---|---|---|
| 1, 33, 65, 97, 129, 161, 193, 225 | 1 | 1 |
| 2, 34, 66, 98, 130, 162, 194, 226 | 2 | 2 |
| 3, 35, 67, 99, 131, 163, 195, 227 | 3 | 3 |
| 4, 36, 68, 100, 132, 164, 196, 228 | 4 | 4 |
| 5, 37, 69, 101, 133, 165, 197, 229 | 5 | 1 |
| 6, 38, 70, 102, 134, 166, 198, 230 | 6 | 2 |
| 7, 39, 71, 103, 135, 167, 199, 231 | 7 | 3 |
| 8, 40, 72, 104, 136, 168, 200, 232 | 8 | 4 |

TABLE 4-continued

Relationship among time-frequency resources on the sending end, first beams and coding redundancy versions

| Series numbers of time-frequency resources | Series numbers of the beams on sending end | Series numbers of coding redundancy versions |
|---|---|---|
| 9, 41, 73, 105, 137, 169, 201, 233 | 9 | 1 |
| 10, 42, 74, 106, 138, 170, 202, 234 | 10 | 2 |
| 11, 43, 75, 107, 139, 171, 203, 235 | 11 | 3 |
| 12, 44, 76, 108, 140, 172, 204, 236 | 12 | 4 |
| 13, 45, 77, 109, 141, 173, 205, 237 | 13 | 1 |
| 14, 46, 78, 110, 142, 174, 206, 238 | 14 | 2 |
| 15, 47, 79, 111, 143, 175, 207, 239 | 15 | 3 |
| 16, 48, 80, 112, 144, 176, 208, 240 | 16 | 4 |
| 17, 49, 81, 113, 145, 177, 209, 241 | 17 | 1 |
| 18, 50, 82, 114, 146, 178, 210, 242 | 18 | 2 |
| 19, 51, 83, 115, 147, 179, 211, 243 | 19 | 3 |
| 20, 52, 84, 116, 148, 180, 212, 244 | 20 | 4 |
| 21, 53, 85, 117, 149, 181, 213, 245 | 21 | 1 |
| 22, 54, 86, 118, 150, 182, 214, 246 | 22 | 2 |
| 23, 55, 87, 119, 151, 183, 215, 247 | 23 | 3 |
| 24, 56, 88, 120, 152, 184, 216, 248 | 24 | 4 |
| 25, 57, 89, 121, 153, 185, 217, 249 | 25 | 1 |
| 26, 58, 90, 122, 154, 186, 218, 250 | 26 | 2 |
| 27, 59, 91, 123, 155, 187, 219, 251 | 27 | 3 |
| 28, 60, 92, 124, 156, 188, 220, 252 | 28 | 4 |
| 29, 61, 93, 125, 157, 189, 221, 253 | 29 | 1 |
| 30, 62, 94, 126, 158, 190, 222, 254 | 30 | 2 |
| 31, 63, 95, 127, 159, 191, 223, 255 | 31 | 3 |
| 32, 64, 96, 128, 160, 192, 224, 256 | 32 | 4 |

In step 601, the terminal decodes received first transmission blocks alternately on 256 different time-frequency resources by using the 8 beams in the third beam group.

For example, receiving is performed on 32 time-frequency resources by using one beam in the third beam group. As shown in Table 5, decoding is performed on the received first transmission block on time-frequency resources 1~32 by using a beam 1 in the third beam group. Decoding is performed on the received first transmission block on time-frequency resources 33~64 by using a beam 2 in the third beam group. Decoding is performed on the received first transmission block on time-frequency resources 65~96 by using a beam 3 in the third beam group. Decoding is performed on the received first transmission block on time-frequency resources 97~128 by using a beam 4 in the third beam group. Decoding is performed on the received first transmission block on time-frequency resources 129~160 by using a beam 5 in the third beam group. Decoding is performed on the received first transmission block on time-frequency resources 161~192 by using a beam 6 in the third beam group. Decoding is performed on the received first transmission block on time-frequency resources 193~224 by using a beam 7 in the third beam group. Decoding is performed on the received first transmission block on time-frequency resources 225~256 by using a beam 8 in the third beam group.

TABLE 5

Relationship between time-frequency resources on the receiving end and second beams

| Series numbers of time-frequency resources | Series numbers of the beams on receiving end |
|---|---|
| 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 | 1 |
| 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 | 2 |
| 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96 | 3 |
| 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128 | 4 |
| 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160 | 5 |
| 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192 | 6 |
| 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224 | 7 |
| 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 | 8 |

The first transmission blocks in different coding redundancy versions and corresponding to different beams may be decoded independently or jointly. For the first transmission blocks of which independent decoding or joint decoding succeeds, the terminal calculates the signal quality of the first transmission blocks which are successfully decoded.

If an independent decoding performed by the terminal on 256 different time-frequency resources fails, the terminal performs a joint decoding on every two of the first transmission blocks of which the independent decoding fails in a same beam in the third beam group. For a plurality of first transmission blocks obtained by successful joint decoding of the joint decoding performed on every two first transmission blocks in a same beam in the third beam group, the signal quality of the first transmission blocks which are successfully decoded is calculated. When the joint decoding performed on every two first transmission blocks fails, a joint decoding on every three first transmission blocks is performed, and so on until a joint decoding on 256 first transmission blocks is performed.

In step 602, when the decoding succeeds, the terminal selects a first transmission block with the strongest signal quality among the first transmission blocks which are successfully decoded, and take the beam corresponding to the selected first transmission block as an optimal beam for sending and receiving for the terminal (that is, the optimal beam in the third beam group mentioned above). The terminal sends feedback information to the base station based on the optimal beam for sending and receiving. The feedback information includes a transmission success identifier, a number of first transmission blocks which are successfully decoded, and a first correspondence relationship between a signal quality or a signal quality difference of the first transmission blocks and beam identifiers of the beams in the first beam group. When decoding fails, the terminal does not send the feedback information.

In this step, the transmission success identifier may be sent separately, or may be sent together with the number of the first transmission blocks which are successfully decoded and the first correspondence relationship.

In this step, the signal quality for example refers to a signal strength, or a signal-to-noise ratio, etc.

In this step, a signal quality difference of a certain first transmission block refers to a difference between a signal quality of this first transmission block and a signal quality of another first transmission block.

In step 603, the base station receives the feedback information from the terminal alternately by using 32 beams in the first beam group. When the feedback information is received, the base station performs a next transmission according to the feedback information sent by the terminal. When the feedback information is not received, it indicates that the transmission fails, and then a transmission of 4 coding redundancy blocks is repeated on the 256 time-frequency resources by using the 32 beams in the first beam group alternately.

In this step, if the terminal reports an independent decoding success of one first transmission block, a beam corresponding to the only reported first transmission block which is successfully decoded is used as a sending beam for a next transmission of new data. Alternatively, according to the reported beam information, five adjacent beams are selected, near the beam corresponding to the only reported first transmission block which id successfully decoded, as subdivided beams for alternative scanning and as the sending beams for the next transmission of new data. And a modulation and coding level of the data newly sent in the next transmission is adjusted according to a signal quality of the beam corresponding to the reported first transmission block which is successfully decoded.

If the terminal reports a success of independent decoding or joint decoding of two or more first transmission blocks, an optimal beam in the first beam group is calculated according to the signal quality or a signal quality difference of the beams corresponding to the reported first transmission blocks which are successfully decoded, and the optimal beam is used as the sending beam for a next transmission of new data. Alternatively, according to the calculated optimal beam in the first beam group, five adjacent beams are selected as subdivided beams for alternative scanning, and as beams for alternative sending for the next transmission of new data. The modulation and coding level of the data newly sent in the next transmission is adjusted according to the signal quality of the beams corresponding to the reported first transmission blocks which are successfully decoded.

From the above description, it can be seen that the embodiments of the present disclosure achieved the following technical effects.

By the method for high-precision fast beam scanning and communication provided by the embodiments of the present disclosure, a beam-based communication process is simplified by combining the beam scanning with a channel measurement and a self-adaptive retransmission. By estimating the channel quality of the transmission blocks which are successfully decoded, the channel measurement accuracy during the beam scanning is improved.

Another embodiment of the present disclosure provides an apparatus for implementing beam scanning and communication, including a processor and a computer-readable storage medium in which instructions are stored. The instructions, when executed by the processor, implement any one of the above methods for implementing the beam scanning and communication.

Another embodiment of the present disclosure provides a computer-readable storage medium on which a computer program is stored. The computer program, when executed by a processor, implements the steps of any one of the above methods for the implementing beam scanning and communication.

Figure 4:
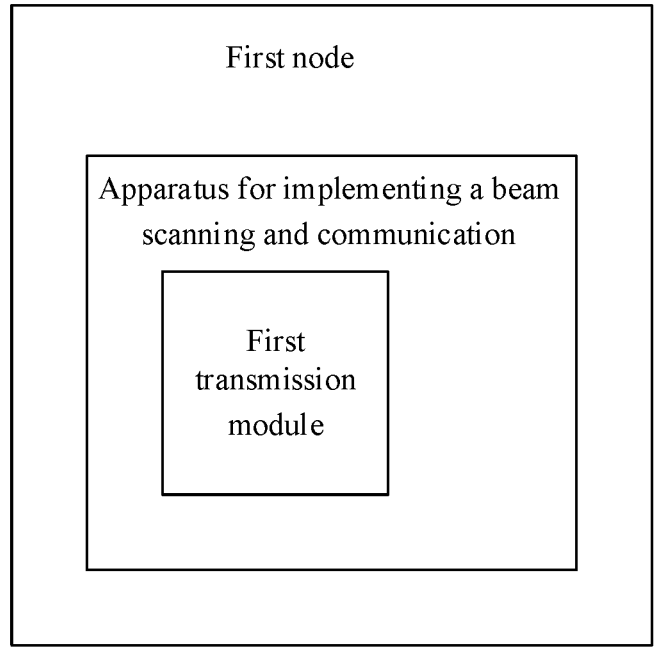
FIG. 4 is a schematic diagram of a structural composition of an apparatus for implementing beam scanning and communication according to yet another embodiment of the present disclosure.

Referring to FIG. 4, another embodiment of the present disclosure provides an apparatus for implementing beam scanning and communication, which is arranged in a first node. The first node may be any communication node, such as a base station, a mobile terminal, a tablet computer, or other wireless communication devices, etc. The apparatus includes:

a first transmission module, configured to send, in an i-th transmission, P first transmission blocks on M1 time-frequency resources by using a first beam group including N1 beams; where the P first transmission blocks are transmission blocks obtained based on a second transmission block and in a same coding redundancy version or different coding redundancy versions, and the i, M1, N1 and P are integers greater than or equal to 1; and determine a second beam group and Q third transmission blocks for a (i+1)-th transmission according to whether feedback information or a transmission failure identifier is received, and send the Q third transmission blocks on M2 time-frequency resources by using the second beam group for the (i+1)-th transmission; where the feedback information or the transmission failure identifier is received by using beams in the first beam group, and the M2 and Q are integers greater than or equal to 1.

In the embodiment of the present disclosure, the first transmission module is specifically configured to send the P first transmission blocks on the M1 time-frequency resources by using the first beam group including the N1 beams in any of the following ways:

sending one or N2 first transmission blocks on a same time-frequency resource by using each beam in the first beam group; where the N2 is a number of beams in a third beam group used by a receiving end for performing reception;

sending one or N2 first transmission blocks on the M1 time-frequency resources by using each beam in the first beam group; or sending one first transmission block on each one of N1×N2 time-frequency resources by using each beam in the first beam group.

In the embodiment of the present disclosure, the first transmission module is specifically configured to determine the second beam group and the Q third transmission blocks for the (i+1)-th transmission according to whether the feedback information or the transmission failure identifier is received in at least one of the following ways:

when the feedback information is received by using at least one beam in the first beam group, determining the second beam group for the (i+1)-th transmission according to the feedback information, and determining that the third transmission blocks are transmission blocks obtained based on a fourth transmission block and in a same coding redundancy version or different coding redundancy versions; where, the feedback information includes a transmission success identifier, a number of first transmission blocks which are successfully decoded, and a first correspondence relationship between a signal quality or a signal quality difference of the first transmission blocks which are successfully decoded and beam identifiers of the beams in the first beam group; or when the feedback information is not received by using any beam in the first beam group, or the transmission failure identifier is received by using at least one beam in the first beam group, determining that the second beam group for the (i+1)-th transmission is the first beam group, and determining that the third transmission blocks are transmission blocks obtained based on the second transmission block and in a same coding redundancy version or different coding redundancy versions, and coding redundancy versions corresponding to the third transmission blocks being identical to or different from coding redundancy versions corresponding to the first transmission blocks.

In the embodiment of the present disclosure, the first transmission module is further configured to:

adjust a modulation and coding level for the (i+1)-th transmission according to the signal quality of the first transmission blocks which are successfully decoded when the feedback information is received by using the at least one beam in the first beam group.

In the embodiment of the present disclosure, the first transmission module is specifically configured to adjust the modulation and coding level for the (i+1)-th transmission according to the signal quality of the first transmission blocks which are successfully decoded in the following way:

searching a modulation and coding level corresponding to the signal quality of the first transmission blocks which are successfully decoded according to a preset second correspondence relationship between modulation and coding levels and signal quality, and adjusting the modulation and coding level for the (i+1)-th transmission to a searched modulation and coding level.

In the embodiment of the present disclosure, the first transmission module is specifically configured to determine the second beam group for the (i+1)-th transmission according to feedback information in the following way:

determining the second beam group for the (i+1)-th transmission according to the number of the first transmission blocks which are successfully decoded and the first correspondence relationship.

In the embodiment of the present disclosure, the first transmission module is specifically configured to determine the second beam group for the (i+1)-th transmission according to the number of the first transmission blocks which are successfully decoded and the first correspondence relationship in at least one of the following ways:

when the number of the first transmission blocks which are successfully decoded is 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or when the number of the first transmission blocks which are successfully decoded is greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

The specific implementation process of the above apparatus for implementing the beam scanning and communication is the same as that of the method for implementing the beam scanning and communication provided in the above embodiments, and will not be repeated here.

Figure 5:
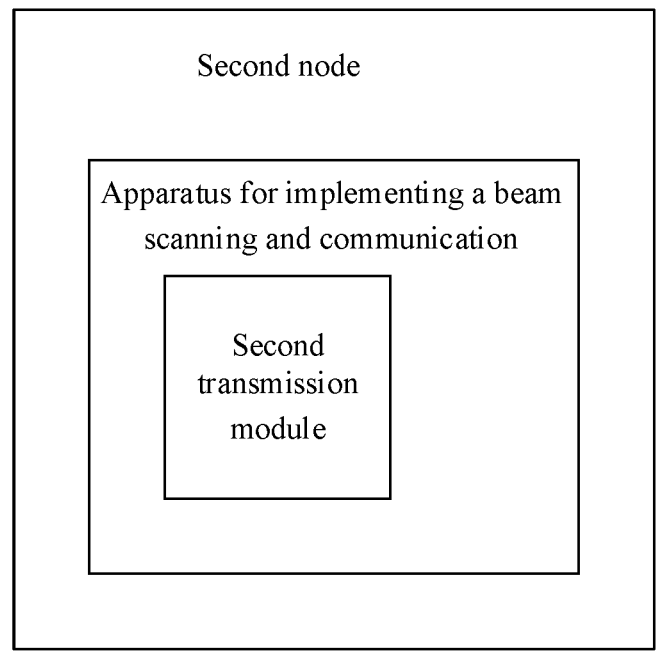
FIG. 5 is a schematic diagram of a structural composition of an apparatus for implementing beam scanning and communication according to yet another embodiment of the present disclosure.
Figure 6:
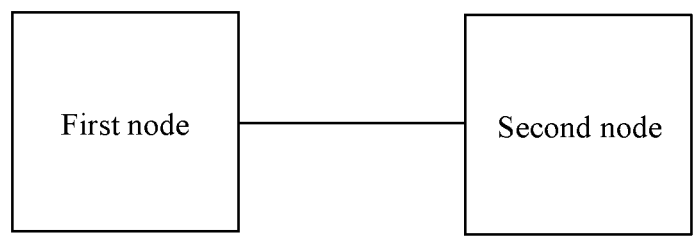
FIG. 6 is a schematic diagram of a structural composition of a system for implementing beam scanning and communication according to yet another embodiment of the present disclosure.

Referring to FIG. 5, another embodiment of the present disclosure provides an apparatus for implementing beam scanning and communication, which is arranged in a second node. The second node may be any communication node, such as a base station, a mobile terminal, a tablet computer, or other wireless communication devices, etc. The apparatus includes:

a second transmission module, configured to decode, in an i-th transmission, P first transmission blocks received on M1 time-frequency resources by using a third beam group including N2 beams to obtain a decoding result of the i-th transmission; where, the P first transmission blocks are transmission blocks obtained based on a second transmission block and in a same coding redundancy version or different coding redundancy versions, and the M1, N2 and P are integers greater than or equal to 1; and determine whether to send feedback information or a transmission failure identifier according to the decoding result of the i-th transmission.

In the embodiment of the present disclosure, the second transmission module is specifically configured to decode the P first transmission blocks received on the M1 time-frequency resources by using the third beam group including the N2 beams to obtain the decoding result of the i-th transmission in at least one of the following ways:

decoding the P first transmission blocks independently by using beams in the third beam group, and when an independent decoding of at least one first transmission block is successful by using at least one beam in the third beam group, determining the decoding result of the i-th transmission as a decoding success;

when an independent decoding of any one of the first transmission blocks by using all the beams in the third beam group is unsuccessful, determining the decoding result of the i-th transmission as a decoding failure;

when an independent decoding of any one of the first transmission blocks by using all the beams in the third beam group is unsuccessful, performing a first joint decoding on the P first transmission blocks by using the beams in the third beam group, and when the first joint decoding is successful, determining the decoding result of the i-th transmission as the decoding success;

when the first joint decoding fails, determining the decoding result of the i-th transmission as the decoding failure;

when the first joint decoding fails, performing a second joint decoding on the P first transmission blocks and part of or all transmission blocks received from a first transmission to an (i−1)-th transmission by using the beams in the third beam group; when the second joint decoding is successful, determining the decoding result of the i-th transmission as the decoding success; or when the second joint decoding fails, determining the decoding result of the i-th transmission as the decoding failure.

In the embodiment of the present disclosure, the second transmission module is specifically configured to determine whether to send the feedback information or the transmission failure identifier according to the decoding result of the i-th transmission in at least one of the following ways:

when the decoding result of the i-th transmission is a decoding failure, not sending the feedback information or sending the transmission failure identifier; or when the decoding result of the i-th transmission is a decoding success, calculating a signal quality of first transmission blocks which are successfully decoded; determining an optimal beam in the third beam group according to the signal quality of the first transmission blocks which are successfully decoded, and sending the feedback information by using the optimal beam in the third beam group; where, the feedback information includes a transmission success identifier, a number of the first transmission blocks which are successfully decoded, and a first correspondence relationship between the signal quality or a signal quality difference of the first transmission blocks which are successfully decoded and beam identifiers of beams in a first beam group.

The specific implementation process of the above apparatus for implementing the beam scanning and communication is the same as that of the method for implementing the beam scanning and communication in the above embodiments, and will not be repeated here.

Another embodiment of the present disclosure provides a system for implementing beam scanning and communication, including:

a first node, configured to send, in an i-th transmission, P first transmission blocks on M1 time-frequency resources by using a first beam group including N1 beams; where the P first transmission blocks are transmission blocks obtained based on a second transmission block and in a same coding redundancy version or different coding redundancy versions, and the M1, N1 and P are integers greater than or equal to 1; and determine a second beam group and Q third transmission blocks for a (i+1)-th transmission according to whether feedback information or a transmission failure identifier is received, and send the Q third transmission blocks on M2 time-frequency resources by using the second beam group for the (i+1)-th transmission; where the feedback information or the transmission failure identifier is received by using beams in the first beam group, and the M2 and Q are integers greater than or equal to 1; and a second node, configured to decode, in the i-th transmission, the P first transmission blocks received on the M1 time-frequency resources by using a third beam group including N2 beams to obtain a decoding result of the i-th transmission; and determine whether to send the feedback information or the transmission failure identifier according to the decoding result of the i-th transmission In the embodiment of the present disclosure, the first node is specifically configured to send the P first transmission blocks on the M1 time-frequency resources by using the first beam group including the N1 beams in any one of the following ways:

sending one or N2 first transmission blocks on a same time-frequency resource by using each beam in the first beam group; where the N2 is a number of beams in a third beam group used by a receiving end for performing reception;

sending one or N2 first transmission blocks on the M1 time-frequency resources by using each beam in the first beam group; or sending one first transmission block on each one of N1×N2 time-frequency resources by using each beam in the first beam group.

In the embodiment of the present disclosure, the first node is specifically configured to determine the second beam group and the Q third transmission blocks for the (i+1)-th transmission according to whether the feedback information or the transmission failure identifier is received by using the first beam group including the N1 beams in at least one of the following ways:

when the feedback information is received by using at least one beam in the first beam group, determining the second beam group for the (i+1)-th transmission according to the feedback information, and determining that the third transmission blocks are transmission blocks obtained based on a fourth transmission block and in a same coding redundancy version or different coding redundancy versions; where, the feedback information includes a transmission success identifier, a number of first transmission blocks which are successfully decoded, and a first correspondence relationship between a signal quality or a signal quality difference of the first transmission blocks which are successfully decoded and beam identifiers of the beams in the first beam group; or when the feedback information is not received by using any beam in the first beam group, or the transmission failure identifier is received by using at least one beam in the first beam group, determining that the second beam group for the (i+1)-th transmission is the first beam group, and determining that the third transmission blocks are transmission blocks obtained based on the second transmission block and in a same coding redundancy version or different coding redundancy versions, and coding redundancy versions corresponding to the third transmission blocks being identical to or different from coding redundancy versions corresponding to the first transmission blocks.

In the embodiment of the present disclosure, the first node is further configured to:

adjust a modulation and coding level for the (i+1)-th transmission according to the signal quality of the first transmission blocks which are successfully decoded when the feedback information is received by using the at least one beam in the first beam group.

In the embodiment of the present disclosure, the first node is specifically configured to adjust the modulation and coding level for the (i+1)-th transmission according to the signal quality of the first transmission blocks which are successfully decoded in the following way:

searching a modulation and coding level corresponding to the signal quality of the first transmission blocks which are successfully decoded according to a preset second correspondence relationship between modulation and coding levels and signal quality, and adjusting the modulation and coding level for the (i+1)-th transmission to a searched modulation and coding level.

In the embodiment of the present disclosure, the first node is specifically configured to determine the second beam group for the (i+1)-th transmission according to feedback information in the following way:

determining the second beam group for the (i+1)-th transmission according to the number of the first transmission blocks which are successfully decoded and the first correspondence relationship.

In the embodiment of the present disclosure, the first node is specifically configured to determine the second beam group for the (i+1)-th transmission according to the number of the first transmission blocks which are successfully decoded and the first correspondence relationship in at least one of the following ways:

when the number of the first transmission blocks which are successfully decoded is 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or when the number of the first transmission blocks which are successfully decoded is greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

In the embodiment of the present disclosure, the second node is specifically configured to decode the P first transmission blocks received on the M1 time-frequency resources by using the third beam group including the N2 beams to obtain the decoding result of the i-th transmission in at least one of the following ways:

decoding the P first transmission blocks independently by using beams in the third beam group, and when an independent decoding of at least one first transmission block is successful by using at least one beam in the third beam group, determining the decoding result of the i-th transmission as a decoding success;

when an independent decoding of any one of the first transmission blocks by using all the beams in the third beam group is unsuccessful, determining the decoding result of the i-th transmission as a decoding failure;

when an independent decoding of any one of the first transmission blocks by using all the beams in the third beam group is unsuccessful, performing a first joint decoding on the P first transmission blocks by using the beams in the third beam group, and when the first joint decoding is successful, determining the decoding result of the i-th transmission as the decoding success;

when the first joint decoding fails, determining the decoding result of the i-th transmission as the decoding failure;

when the first joint decoding fails, performing a second joint decoding on the P first transmission blocks and part of or all transmission blocks received from a first transmission to an (i−1)-th transmission by using the beams in the third beam group; when the second joint decoding is successful, determining the decoding result of the i-th transmission as the decoding success; or when the second joint decoding fails, determining the decoding result of the i-th transmission as the decoding failure.

In the embodiment of the present disclosure, the second node is specifically configured to determine whether to send the feedback information or the transmission failure identifier according to the decoding result of the i-th transmission in at least one of the following ways:

when the decoding result of the i-th transmission is a decoding failure, not sending the feedback information or sending the transmission failure identifier; or when the decoding result of the i-th transmission is a decoding success, calculating a signal quality of first transmission blocks which are successfully decoded; determining an optimal beam in the third beam group according to the signal quality of the first transmission blocks which are successfully decoded, and sending the feedback information by using the optimal beam in the third beam group; where, the feedback information includes a transmission success identifier, a number of the first transmission blocks which are successfully decoded, and a first correspondence relationship between the signal quality or a signal quality difference of the first transmission blocks which are successfully decoded and beam identifiers of beams in a first beam group.

The specific implementation process of the above system for implementing the beam scanning and communication is the same as that of the method for implementing the beam scanning and communication in the above embodiments, and will not be repeated here.

Those having ordinary skill in the art shall understand that all or some of the steps in the method disclosed above and the functional modules/units in the system and the apparatus can be implemented as software, firmware, hardware and an appropriate combination thereof. In the hardware implementation, division between functional modules/units mentioned in the above description does not necessarily correspond to division of physical components. For example, one physical component may have multiple functions, or one function or step may be implemented by several physical components. Some physical components or all physical components may be implemented as software executed by a processor, such as a central processing unit, a digital signal processor, or a microprocessor, or may be implemented as hardware, or may be implemented as an integrated circuit, for example, an application specific integrated circuit. Such software can be distributed on a computer-readable medium, which can include a computer storage medium (or non-transitory medium) and a communication medium (or transitory medium). As well known to those having ordinary skill in the art, the term computer storage medium includes a volatile or non-volatile, removable or irremovable medium implemented in any method or technology applied to storage information (such as a computer-readable instruction, a data structure, a computer program module or other data). The computer storage medium includes, but is not limited to, a random access memory (RAM), a read-only memory (ROM), an electrically erasable programmable read only memory (EEPROM), a flash memory or other memory technology, a compact disc read-only memory (CD-ROM), a digital versatile disc (DVD) or another optical disc memory, a magnetic box, a magnetic tape, a magnetic disc or another magnetic storage apparatus, or any other medium applicable to storing desired information and accessible by a computer. In addition, as is well known to those having ordinary skill in the art, the communication medium usually includes computer-readable instructions, data structures, program modules, or other data in a modulated data signal such as a carrier wave or other transmission mechanisms, and may include any information delivery medium.

Although the implementations disclosed in the embodiments of the present disclosure are as above, the contents described are only the implementations used for the convenience of understanding the embodiments of the present disclosure, and are not intended to limit the embodiments of the present disclosure. Any person skilled in the art to which the embodiments of the present disclosure belong may make any modifications and changes in forms and details of implementations without departing from the spirit and scope disclosed in the embodiments of the present disclosure. However, the patent protection scope of the embodiments of the present disclosure shall still be subject to the scope limited by the appended claims.

What is claimed is:

1. A method for implementing beam scanning and communication under a condition that there is no beam pairing between a first node and a second node, and the method comprises:
    under the condition that there is no beam pairing between the first node and the second node, sending, by the first node in an i-th transmission, P first transmission blocks on M1 time-frequency resources using a first beam group comprising N1 beams to the second node, wherein the P first transmission blocks are obtained based on a second transmission block and are in a same coding redundancy version or different coding redundancy versions, and the i, M1, N1 and P are integers greater than or equal to 1, and the P first transmission blocks are data for communication;
    determining, by the first node, a second beam group and Q third transmission blocks for a (i+1)-th transmission according to whether feedback information or a transmission failure identifier is received, wherein the Q third transmission blocks are data for communication; and
    wherein the determining, by the first node, the second beam group and the Q third transmission blocks for the (i+1)-th transmission according to whether the feedback information or the transmission failure identifier is received comprises:
    in response to the feedback information being not received by using any beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P first transmission blocks;
    in response to the feedback information or the transmission failure identifier being received by using beams in the first beam group, sending, by the first node, the Q third transmission blocks on M2 time-frequency resources by using the second beam group for the (i+1)-th transmission to the second node, wherein the M2 and Q are integers greater than or equal to 1.

2. The method according to claim 1, wherein the sending, by the first node in the i-th transmission, the P first transmission blocks on the M1 time-frequency resources by using the first beam group comprising the N1 beams to the second node comprises any one of the following:
    sending one or N2 first transmission blocks on a same time-frequency resource by using each beam in the first beam group; wherein N2 is a number of beams in a third beam group used by a receiving end for performing reception;
    sending one or N2 first transmission blocks on the M1 time-frequency resources by using each beam in the first beam group; or
    sending one first transmission block on each one of N1×N2 time-frequency resources by using each beam in the first beam group.

3. The method according to claim 1, wherein the determining, by the first node, the second beam group and the Q third transmission blocks for the (i+1)-th transmission according to whether the feedback information or the transmission failure identifier is received further comprises at least one of the following:
    in response to the feedback information being received by using at least one beam in the first beam group, determining the second beam group for the (i+1)-th transmission according to the feedback information, and determining that the Q third transmission blocks are transmission blocks obtained based on a fourth transmission block and in a same coding redundancy version or different coding redundancy versions; wherein, the feedback information comprises a transmission success identifier, a number of first transmission blocks which are successfully decoded, and a first correspondence relationship between a signal quality or a signal quality difference of the first transmission blocks which are successfully decoded and beam identifiers of the beams in the first beam group; or
    in response to the feedback information being not received by using any beam in the first beam group, or the transmission failure identifier being received by using at least one beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P first transmission blocks.

4. The method according to claim 3, wherein in response to the feedback information being received by using the at least one beam in the first beam group, the method further comprises:
    adjusting a modulation and coding level for the (i+1)-th transmission according to the signal quality of the first transmission blocks which are successfully decoded.

5. The method according to claim 4, wherein, the adjusting the modulation and coding level for the (i+1)-th transmission according to the signal quality of the first transmission blocks which are successfully decoded comprises:
    searching a modulation and coding level corresponding to the signal quality of the first transmission blocks which are successfully decoded according to a preset second correspondence relationship between modulation and coding levels and signal quality, and adjusting the modulation and coding level for the (i+1)-th transmission to a searched modulation and coding level.

6. The method according to claim 3, wherein the determining the second beam group for the (i+1)-th transmission according to feedback information comprises:
    determining the second beam group for the (i+1)-th transmission according to the number of the first transmission blocks which are successfully decoded and the first correspondence relationship.

7. The method according to claim 6, wherein the determining the second beam group for the (i+1)-th transmission according to the number of the first transmission blocks which are successfully decoded and the first correspondence relationship comprises at least one of the following:
- in response to the number of the first transmission blocks which are successfully decoded being 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or
- in response to the number of the first transmission blocks which are successfully decoded being greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

8. A method for implementing beam scanning and communication under a condition that there is no beam pairing between a first node and a second node, and the method comprises:
- under the condition that there is no beam pairing between the first node and the second node, decoding, by the second node in an i-th transmission, P first transmission blocks sent from the first node and received on M1 time-frequency resources using a third beam group comprising N2 beams to obtain a decoding result of the i-th transmission, wherein the P first transmission blocks are obtained based on a second transmission block and in a same coding redundancy version or different coding redundancy versions, and the i, M1, N2 and P are integers greater than or equal to 1, and wherein the P first transmission blocks are data for communication; and
- determining, by the second node, whether to send feedback information or a transmission failure identifier to the first node according to the decoding result of the i-th transmission;
- wherein the determining, by the second node, whether to send the feedback information or the transmission failure identifier to the first node according to the decoding result of the i-th transmission comprises:
- in response to the decoding result of the i-th transmission being a decoding failure, not sending the feedback information;
- in response to the decoding result of the i-th transmission being a decoding success, calculating a signal quality of first transmission blocks which are successfully decoded;
- determining an optimal beam in the third beam group according to the signal quality of the first transmission blocks which are successfully decoded;
- sending the feedback information by using the optimal beam in the third beam group, wherein the feedback information comprises a transmission success identifier and a number of the first transmission blocks which are successfully decoded.

9. The method according to claim 8, wherein, decoding, by the second node in the i-th transmission, the P first transmission blocks sent from the first node and received on the M1 time-frequency resources by using the third beam group comprising N2 beams to obtain the decoding result of the i-th transmission comprises at least one of the following:
- decoding the P first transmission blocks independently by using beams in the third beam group, and in response to an independent decoding of at least one first transmission block being successful by using at least one beam in the third beam group, determining the decoding result of the i-th transmission as a decoding success;
- in response to an independent decoding of any one of the P first transmission blocks by using all the beams in the third beam group being unsuccessful, determining the decoding result of the i-th transmission as a decoding failure;
- in response to an independent decoding of any one of the P first transmission blocks by using all the beams in the third beam group being unsuccessful, performing a first joint decoding on the P first transmission blocks by using the beams in the third beam group, and in response to the first joint decoding being successful, determining the decoding result of the i-th transmission as the decoding success;
- in response to a failure of the first joint decoding, determining the decoding result of the i-th transmission as the decoding failure;
- in response to the failure of the first joint decoding, performing a second joint decoding on the P first transmission blocks and part of or all transmission blocks received from a first transmission to an (i−1)-th transmission by using the beams in the third beam group; in response to the second joint decoding being successful, determining the decoding result of the i-th transmission as the decoding success; or
- in response to a failure of the second joint decoding, determining the decoding result of the i-th transmission as the decoding failure.

10. The method according to claim 8, wherein
the feedback information further comprises a first correspondence relationship between the signal quality or a signal quality difference of the first transmission blocks which are successfully decoded and beam identifiers of beams in a first beam group.

11. An apparatus for implementing beam scanning and communication arranged in a first node, comprising a processor and a computer-readable storage medium in which instructions are stored, wherein the instructions, when executed by the processor, implement a method for implementing beam scanning and communication under a condition that there is no beam pairing between the first node and a second node, and the method comprises:
- under the condition that there is no beam pairing between the first node and the second node, sending, in an i-th transmission, P first transmission blocks on M1 time-frequency resources using a first beam group comprising N1 beams to the second node, wherein the P first transmission blocks are obtained based on a second transmission block and are in a same coding redundancy version or different coding redundancy versions, and the i, M1, N1 and P are integers greater than or equal to 1, and the P first transmission blocks are data for communication;
- determining a second beam group and Q third transmission blocks for a (i+1)-th transmission according to whether feedback information or a transmission failure identifier is received, wherein the Q third transmission blocks are data for communication; and wherein the determining the second beam group and the Q third transmission blocks for the (i+1)-th transmission according to whether the feedback information or the transmission failure identifier is received comprises:

in response to the feedback information being not received by using any beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P first transmission blocks;

in response to the feedback information or the transmission failure identifier being received by using beams in the first beam group, sending the Q third transmission blocks on M2 time-frequency resources using the second beam group for the (i+1)-th transmission to the second node, wherein the M2 and Q are integers greater than or equal to 1.

12. The apparatus according to claim 11, wherein the sending, in the i-th transmission, the P first transmission blocks on the M1 time-frequency resources by using the first beam group comprising the N1 beams to the second node comprises any one of the following:

sending one or N2 first transmission blocks on a same time-frequency resource by using each beam in the first beam group; wherein N2 is a number of beams in a third beam group used by a receiving end for performing reception;

sending one or N2 first transmission blocks on the M1 time-frequency resources by using each beam in the first beam group; or sending one first transmission block on each one of N1×N2 time-frequency resources by using each beam in the first beam group.

13. The apparatus according to claim 11, wherein the determining the second beam group and the Q third transmission blocks for the (i+1)-th transmission according to whether the feedback information or the transmission failure identifier is received further comprises at least one of the following:

in response to the feedback information being received by using at least one beam in the first beam group, determining the second beam group for the (i+1)-th transmission according to the feedback information, and determining that the Q third transmission blocks are transmission blocks obtained based on a fourth transmission block and in a same coding redundancy version or different coding redundancy versions; wherein, the feedback information comprises a transmission success identifier, a number of first transmission blocks which are successfully decoded, and a first correspondence relationship between a signal quality or a signal quality difference of the first transmission blocks which are successfully decoded and beam identifiers of the beams in the first beam group; or in response to the feedback information being not received by using any beam in the first beam group, or the transmission failure identifier being received by using at least one beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P_first transmission blocks.

14. The apparatus according to claim 13, wherein in response to the feedback information being received by using the at least one beam in the first beam group, the method further comprises:

adjusting a modulation and coding level for the (i+1)-th transmission according to the signal quality of the first transmission blocks which are successfully decoded.

15. The apparatus according to claim 14, wherein, the adjusting the modulation and coding level for the (i+1)-th transmission according to the signal quality of the first transmission blocks which are successfully decoded comprises:

searching a modulation and coding level corresponding to the signal quality of the first transmission blocks which are successfully decoded according to a preset second correspondence relationship between modulation and coding levels and signal quality, and adjusting the modulation and coding level for the (i+1)-th transmission to a searched modulation and coding level.

16. The apparatus according to claim 13, wherein the determining the second beam group for the (i+1)-th transmission according to feedback information comprises:

determining the second beam group for the (i+1)-th transmission according to the number of the first transmission blocks which are successfully decoded and the first correspondence relationship.

17. The apparatus according to claim 16, wherein the determining the second beam group for the (i+1)-th transmission according to the number of the first transmission blocks which are successfully decoded and the first correspondence relationship comprises at least one of the following:

in response to the number of the first transmission blocks which are successfully decoded being 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or in response to the number of the first transmission blocks which are successfully decoded being greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

18. A non-transitory computer-readable storage medium on which a computer program is stored, wherein the computer program, when executed by a processor arranged in a first node, implements a method for implementing beam scanning and communication under a condition that there is no beam pairing between a first node and a second node, and the method comprises:

under the condition that there is no beam pairing between the first node and the second node, sending, in an i-th transmission, P first transmission blocks on M1 time-frequency resources using a first beam group comprising N1 beams to the second node, wherein the P first transmission blocks are obtained based on a second transmission block and are in a same coding redundancy version or different coding redundancy versions, and the i, M1, N1 and P are integers greater than or equal to 1, and the P first transmission blocks are data for communication;

determining a second beam group and Q third transmission blocks for a (i+1)-th transmission according to whether feedback information or a transmission failure identifier is received, wherein the Q third transmission blocks are data for communication; and wherein the determining the second beam group and the Q third transmission blocks for the (i+1)-th transmission according to whether the feedback information or the transmission failure identifier is received comprises:

in response to the feedback information being not received by using any beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P_first transmission blocks;

in response to the feedback information or the transmission failure identifier being received by using beams in the first beam group, sending the Q third transmission blocks on M2 time-frequency resources using the second beam group for the (i+1)-th transmission to the second node, wherein the M2 and Q are integers greater than or equal to 1.

19. The non-transitory computer-readable storage medium according to claim 18, wherein the sending, in the i-th transmission, the P first transmission blocks on the M1 time-frequency resources by using the first beam group comprising the N1 beams to the second node comprises any one of the following:

sending one or N2 first transmission blocks on a same time-frequency resource by using each beam in the first beam group; wherein N2 is a number of beams in a third beam group used by a receiving end for performing reception;

sending one or N2 first transmission blocks on the M1 time-frequency resources by using each beam in the first beam group; or sending one first transmission block on each one of N1×N2 time-frequency resources by using each beam in the first beam group.

20. The non-transitory computer-readable storage medium according to claim 18, wherein the determining the second beam group and the Q third transmission blocks for the (i+1)-th transmission according to whether the feedback information or the transmission failure identifier is received further comprises at least one of the following:

in response to the feedback information being received by using at least one beam in the first beam group, determining the second beam group for the (i+1)-th transmission according to the feedback information, and determining that the Q third transmission blocks are transmission blocks obtained based on a fourth transmission block and in a same coding redundancy version or different coding redundancy versions; wherein, the feedback information comprises a transmission success identifier, a number of first transmission blocks which are successfully decoded, and a first correspondence relationship between a signal quality or a signal quality difference of the first transmission blocks which are successfully decoded and beam identifiers of the beams in the first beam group; or in response to the feedback information being not received by using any beam in the first beam group, or the transmission failure identifier being received by using at least one beam in the first beam group, determining that the second beam group for the (i+1)-th transmission is the first beam group, and determining that the Q third transmission blocks are transmission blocks obtained based on the second transmission block and in a same coding redundancy version or different coding redundancy versions, and coding redundancy versions corresponding to the Q third transmission blocks being identical to or different from coding redundancy versions corresponding to the P first transmission blocks.

21. The non-transitory computer-readable storage medium according to claim 20, wherein in response to the feedback information being received by using the at least one beam in the first beam group, the method further comprises:

adjusting a modulation and coding level for the (i+1)-th transmission according to the signal quality of the first transmission blocks which are successfully decoded.

22. The non-transitory computer-readable storage medium according to claim 21, wherein, the adjusting the modulation and coding level for the (i+1)-th transmission according to the signal quality of the first transmission blocks which are successfully decoded comprises:

searching a modulation and coding level corresponding to the signal quality of the first transmission blocks which are successfully decoded according to a preset second correspondence relationship between modulation and coding levels and signal quality, and adjusting the modulation and coding level for the (i+1)-th transmission to a searched modulation and coding level.

23. The non-transitory computer-readable storage medium according to claim 20, wherein the determining the second beam group for the (i+1)-th transmission according to feedback information comprises:

determining the second beam group for the (i+1)-th transmission according to the number of the first transmission blocks which are successfully decoded and the first correspondence relationship.

24. The non-transitory computer-readable storage medium according to claim 23, wherein the determining the second beam group for the (i+1)-th transmission according to the number of the first transmission blocks which are successfully decoded and the first correspondence relationship comprises at least one of the following:

in response to the number of the first transmission blocks which are successfully decoded being 1, using a beam corresponding to a first transmission block which is successfully decoded in the first beam group as a beam of the second beam group for the (i+1)-th transmission; or, using the beam corresponding to the first transmission block which is successfully decoded in the first beam group and one or more adjacent beams as beams of the second beam group for the (i+1)-th transmission; or in response to the number of the first transmission blocks which are successfully decoded being greater than 1, determining an optimal beam in the first beam group according to the signal quality or the signal quality difference of the first transmission blocks which are successfully decoded, and using the optimal beam in the first beam group as the beam of the second beam group for the (i+1)-th transmission; or, using the optimal beam in the first beam group and one or more first adjacent beams as the beams of the second beam group for the (i+1)-th transmission.

\* \* \* \* \*